United States Patent [19]

Ott et al.

[11] 4,041,456

[45] Aug. 9, 1977

[54] METHOD FOR VERIFYING THE DENOMINATION OF CURRENCY

[76] Inventors: David M. Ott; Cynthia Bunce Ott, both of 1720 Walnut St., El Cerrito, Calif. 94530; John G. Stoides, 206 W. Asher, Culpeper, Va. 22701

[21] Appl. No.: 710,217

[22] Filed: July 30, 1976

[51] Int. Cl.[2] .............................................. G06K 9/00

[52] U.S. Cl. ....................... 340/146.3 R; 209/DIG. 2; 235/61.11 K; 340/146.3 Q

[58] Field of Search ................. 340/146.3 Q, 146.3 R, 340/146.3 S; 356/71; 209/111.8, 111.7, 111.5, DIG. 2; 235/61.11 K, 92 SB

[56] References Cited

U.S. PATENT DOCUMENTS

| | | | |
|---|---|---|---|
| 2,731,621 | 1/1956 | Sontheimer | 235/61.11 K |
| 2,922,893 | 1/1960 | Ett | 235/61.11 K |
| 2,941,187 | 6/1960 | Simjian | 235/61.11 K |
| 3,031,076 | 4/1962 | De Claris et al. | 209/DIG. 2 |
| 3,576,534 | 4/1971 | Steinberger | 340/146.3 Q |
| 3,725,667 | 4/1973 | Schwartz | 209/DIG. 2 |
| 3,782,543 | 1/1974 | Martelli et al. | 209/DIG. 2 |
| 3,930,582 | 1/1976 | Gartner et al. | 235/61.11 K |

*Primary Examiner*—Leo H. Boudreau
*Attorney, Agent, or Firm*—Flehr, Hohbach, Test, Albritton & Herbert

[57] ABSTRACT

A bill to be verified is scanned lengthwise by a two track optical sensor. For each bill the resulting analog signals are divided into eight segments or windows each segment producing a binary coded pattern produced by delta modulation. This is compared to a stored reference and a number is produced representing the dissimilarity between the bill being scanned and the average bill of that denomination with which it is being compared. Thereafter, a processor compares the foregoing numbers with additional quantitative functions which have previously been stored relating the corresponding segments of the bill denomination being scanned to other bill denominations. With the use of limit and weighting functions they are summed over the eight different effective windows and a decision is made as to whether the proper denomination is present.

11 Claims, 17 Drawing Figures

FIG-5
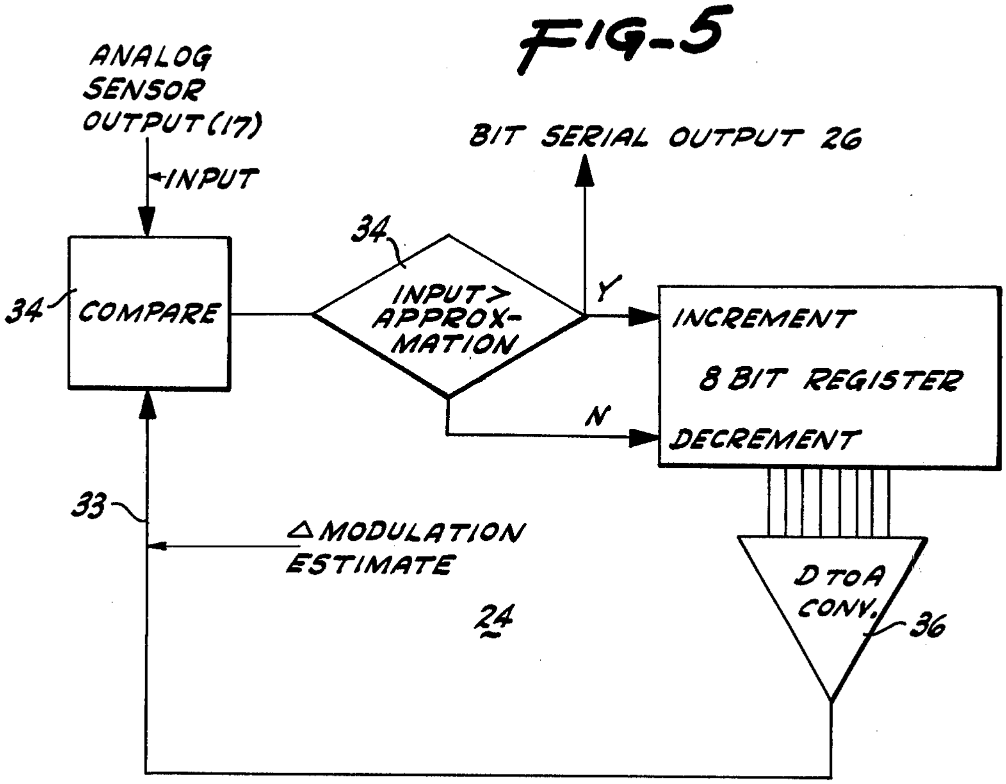
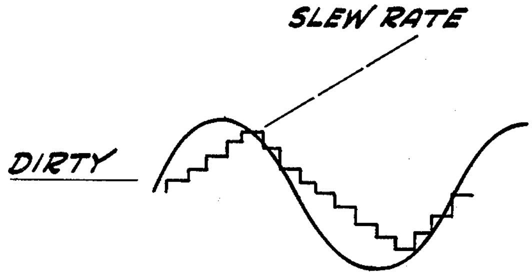
FIG-6A
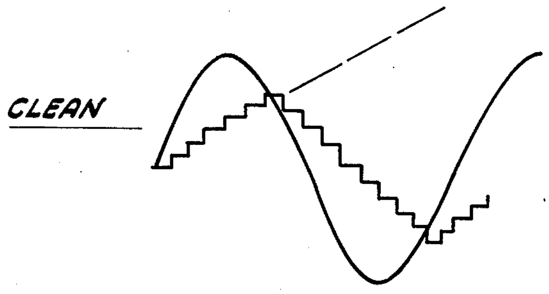
FIG-6B

"PROCESS" SUBROUTINE

FIG-10A (SEE FIGS. 11A, 11B, 11C)

ROM TABLE 34 RSU $5

| | RSU $1 | | RSU $2 | | RSU $10 | | RSU $20 | | RSU $50 | | RSU $100 | | USD $1 | | USD $2 | | USD $10 | | USD $20 | | USD $50 | | USD $100 | |
|---|---|---|---|---|---|---|---|---|---|---|---|---|---|---|---|---|---|---|---|---|---|---|---|---|
| UPPER W1 | 0 | 0 | 24 | 1 | 0 | 0 | 0 | 0 | 0 | 0 | 0 | 0 | 22 | 1 | 21 | 2 | 23 | 1 | 24 | 2 | 13 | 1 | 10 | 1 |
| LOWER W1 | 17 | 1 | 23 | 1 | 14 | 1 | 0 | 0 | 20 | 1 | 16 | 1 | 25 | 2 | 17 | 1 | 0 | 0 | 16 | 1 | 0 | 0 | 11 | 1 |
| UPPER W2 | 0 | 0 | 0 | 0 | 0 | 0 | 0 | 0 | 0 | 0 | 0 | 0 | 0 | 0 | 0 | 0 | 13 | 1 | 13 | 1 | 0 | 0 | 0 | 0 |
| LOWER W2 | 22 | 1 | 23 | 1 | 20 | 1 | 32 | 2 | 23 | 1 | 17 | 1 | 17 | 1 | 22 | 1 | 25 | 2 | 0 | 0 | 15 | 1 | 0 | 0 |
| UPPER W3 | 22 | 2 | 0 | 0 | 11 | 1 | 11 | 1 | 0 | 0 | 0 | 0 | 15 | 1 | 0 | 0 | 0 | 0 | 23 | 2 | 0 | 0 | 0 | 0 |
| LOWER W3 | 26 | 3 | 22 | 2 | 22 | 3 | 20 | 3 | 20 | 3 | 16 | 2 | 24 | 3 | 22 | 3 | 11 | 1 | 17 | 2 | 20 | 3 | 16 | 3 |
| UPPER W4 | 17 | 1 | 31 | 2 | 0 | 0 | 27 | 2 | 0 | 0 | 21 | 2 | 15 | 1 | 31 | 3 | 24 | 2 | 31 | 3 | 16 | 1 | 27 | 3 |
| LOWER W4 | 13 | 1 | 30 | 3 | 13 | 1 | 22 | 2 | 12 | 1 | 22 | 3 | 13 | 1 | 24 | 3 | 0 | 0 | 16 | 1 | 0 | 0 | 13 | 1 |

LIMIT (OCTAL)
WEIGHT

FIG-10B

| | | | | | | | | | | | | |
|---|---|---|---|---|---|---|---|---|---|---|---|---|
| Σ $5 RSU WEIGHTS | | | | | | | | | | | | |

RAM SUMMATION TABLE 35 (RIGHT SIDE UP PORTION)

METHOD FOR VERIFYING THE DENOMINATION OF CURRENCY

BACKGROUND OF THE INVENTION

The present invention is directed to a method for sensing the denomination of a currency. More specifically, the invention contemplates verifying, for example, a one dollar denomination of U.S. currency versus all of the other dollar denominations and in addition, in a different mode of operation selecting several different denominations from a group of currency bills.

Existing denomination sensors rely on several different techniques. In general some characteristic of the denomination is sensed and compared with a reference standard. In Mustert U.S. Pat. No. 3,679,314 different spectral distributions of the bill are sensed; in Carter U.S. pat. No. 3,870,629 phase locked loops are used to detect frequency characteristics of the bills. In Riddle U.S. Pat. No. 3,280,974 changes in the magnetic flux of a moving bill are sensed due to spatial variation of the magnetic printing ink; finally, in Hong U.S. Pat. No. 3,845,466 the output of a photodetector is processed to form a probability density function which is compared with a prestored function.

All of the foregoing techniques are either excessively complicated for high speed verification or else lack the required accuracy; i.e., accuracies of less than 99% are not acceptable.

OBJECTS AND SUMMARY OF THE INVENTION

It is, therefore, a general object of the present invention to provide an improved method for verifying the denomination of currency relative to other denominations of such currency.

It is a more specific object to provide a method as above which is fast and highly accurate.

In accordance with the above objects there is provided a method for verifying the denomination of currency relative to other denominations of such currency. The method comprises the following steps. A pattern representative of the reflectivity of at least one predetermined segment of at least one currency denomination is stored. A currency denomination to be verified is scanned over the predetermined segment and a pattern is generated representative of such segment. The pattern of the scanned currency denomination is compared with a stored pattern of the same denomination and a quantitative function indicative of the amount of comparison between the patterns is generated. Quantitative functions indicative of the amount of comparison between the stored pattern of the same denomination and the corresponding segments of the other denominations are stored. Each of these quantitative functions of the other denominations are compared with the generated quantitative function.

BRIEF DESCRIPTION OF THE DRAWINGS

FIG. 5 is a detailed block diagram of a portion of FIG. 2 useful in understanding the diagram of FIGS. 3 and 4;

FIGS. 6A and 6B are waveforms useful in explaining an advantage of FIG. 5;

FIG. 10A shows one of the data tables of FIG. 9 in greater detail;

FIG. 10B is a RAM summation table utilized in FIG. 2;

DETAILED DESCRIPTION OF THE PREFERRED EMBODIMENTS

Figure 1:
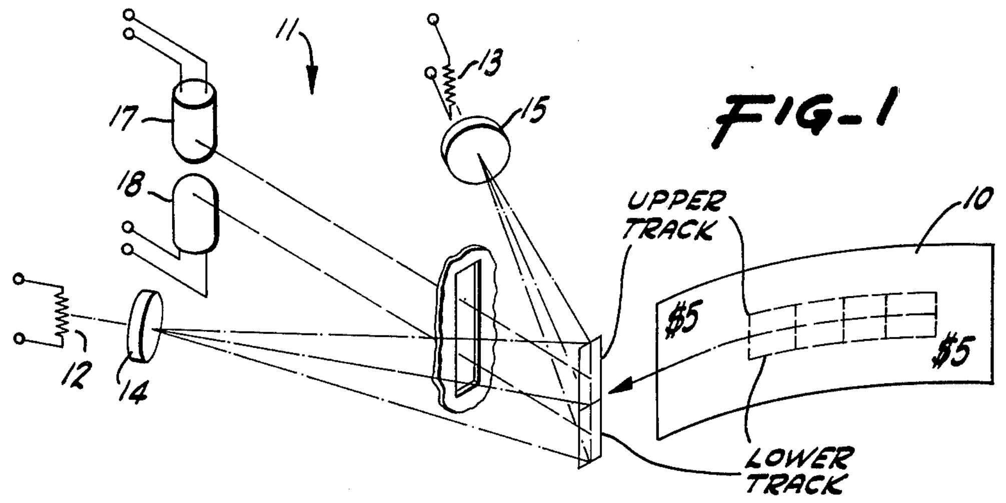
FIG. 1 is a partial perspective view of an optical scanning system embodying the present invention.

FIG. 1 illustrates a five dollar bill 10 of U.S. currency which is optically scanned by a sensing apparatus 11. Such apparatus includes a pair of light sources 12 and 13 with appropriate focusing lenses 14 and 15. Light from these sources impinge on the bill 10 in an upper and lower track and the reflected light from such tracks are respectively sensed by photodetectors or optical sensors 17 and 18. Each track is logically divided into four segments or windows as indicated in dashed outline to thus provide eight windows. These eight windows are centered on the back side of the bill which carries much more unique information as to its denomination relative to the front side or other portions of the back side.

Figure 2:
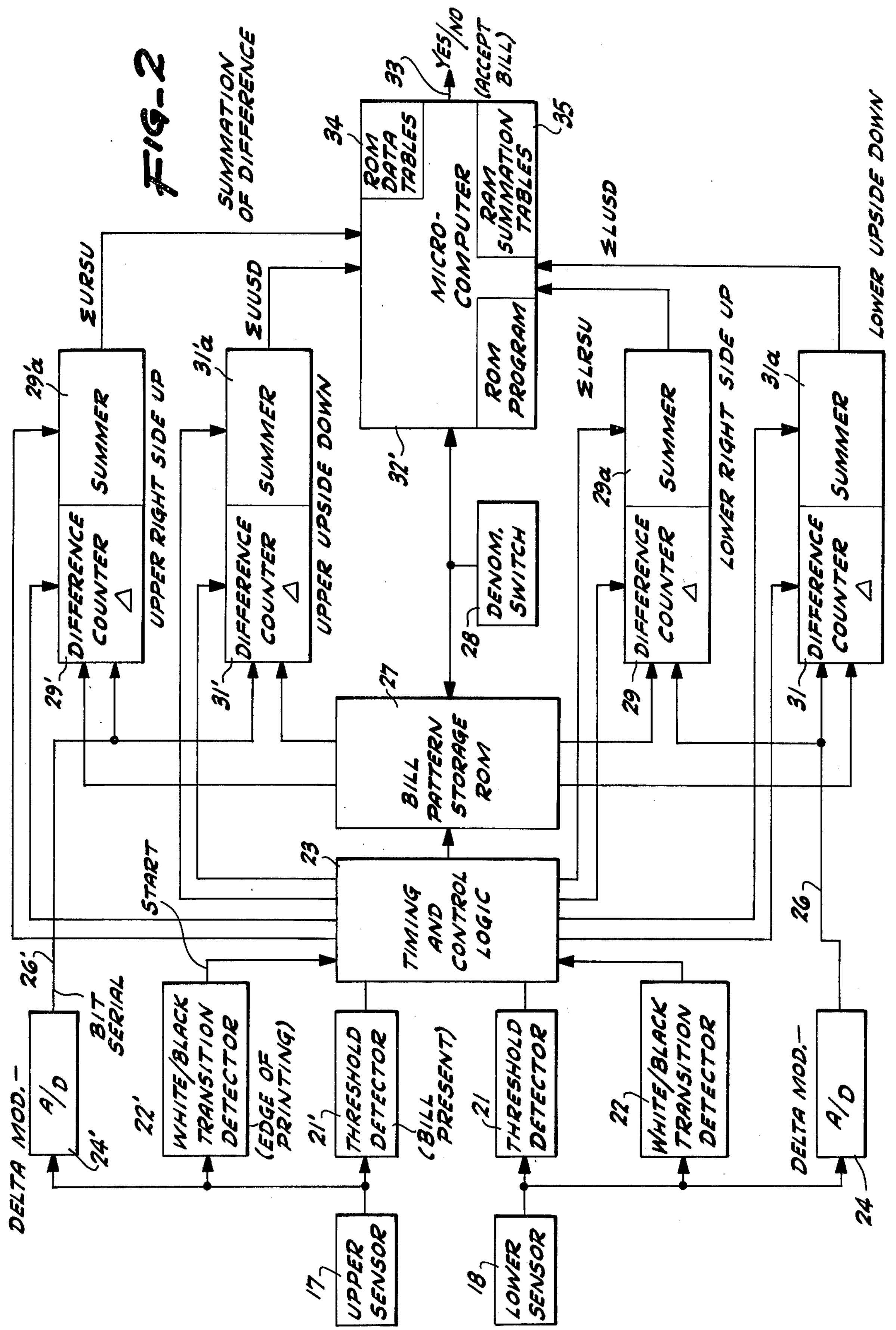
FIG. 2 is a block diagram of the remainder of the system embodying the present invention which receives the signals generated by the scanning apparatus of FIG. 1.

Except for the use of dual tracks and several windows or segments the mechanical configuration of the scanning system is standard. FIG. 2 illustrates the upper and lower sensors 17 and 18 and the remainder of the electrical hardware for processing the optical information provided by the sensors. The analog signal samples from the upper and lower sensors are processed identically and thus only the lower sensor hardware will be described the upper sensor hardware being referenced by primed numbers.

Initially, a threshold detector 21 determines whether or not a bill is present and a white/black transition detector 22 senses the edge of the printing on the bill in order to provide a reference point for timing. In other words, the output of the white/black transition detector 22 is a start output which is connected to timing and control logic unit 23. Each sensor 17 and 18 provides a sequence of 64 analog samples for each of the windows or segments as illustrated in FIG. 1. These 64 samples are processed by a delta modulation analog to digital converter unit 24 to provide on line 26 a binary coded output which is a 64 bit sequence representing the 64 sampled analog levels supplied by sensor 17 encoded into a standard delta pulse code modulation pattern.

A similar pattern is stored in the bill pattern storage read only memory (ROM) 27. Such similar pattern is actually an average of several samples of a corresponding segment of the same currency denomination. In practice the bill pattern storage is completed by averaging 256 bills of one currency denomination. This number was used since the logic of the present invention is in an octal format and thus an average of 256 can be obtained by merely eliminating the eight least significant bits of the sum.

A denomination switch 28 is set by the user to choose which currency denomination is to be verified. The corresponding pattern from storage unit 27 is then connected to the difference counters 29 and 31 and compared on a bit by bit basis with the serial pattern sequence on line 26 which is connected to both of these difference counters. The difference counter 29 relates to the lower track where the bill is in the optical scanner in a right side up relationship. The invention also has the capability of sensing a bill which is upside down which is accomplished by difference counter 31. After a bit by bit comparison is made, the absolute magnitude of the difference for each sample which has been computed by the difference counter is integrated or summed by the summers 29*a* and 31*a* to produce the outputs designated ΣLRSU and ΣLUSD which respectively relate to the lower track right side up or lower track upside down bill orientation. These outputs are connected to a microcomputer 32 and are in essence quantitative functions. They are the summation of the absolute magnitudes of the differences between the two delta modulation patterns and are indicative of the amount of comparison of the sampled pattern compared to the stored or average bill pattern which is used as a reference.

Similarly, relative to the upper sensor 17 similar quantitative functions ΣURSU representing an upper track right side up orientation of the bill and ΣUUSD representing an upper track upside down orientation are also generated. Microcomputer 32 in a manner to be described below then makes a decision as to whether or not the bill being scaned is of the selected denomination and provides on its output line 33 a yes/no decision which is connected to the mechanical equipment for processing the currency for accepting or rejecting it.

The use of the delta modulation technique allows for minimum digital storage requirements since a comparison of only one bit at a time need be made. This is as compared to where the analog level of the sample is translated to, for example, a typical eight bit level digital code where, of course, an eight bit comparison would be required for each sample.

Figure 3:
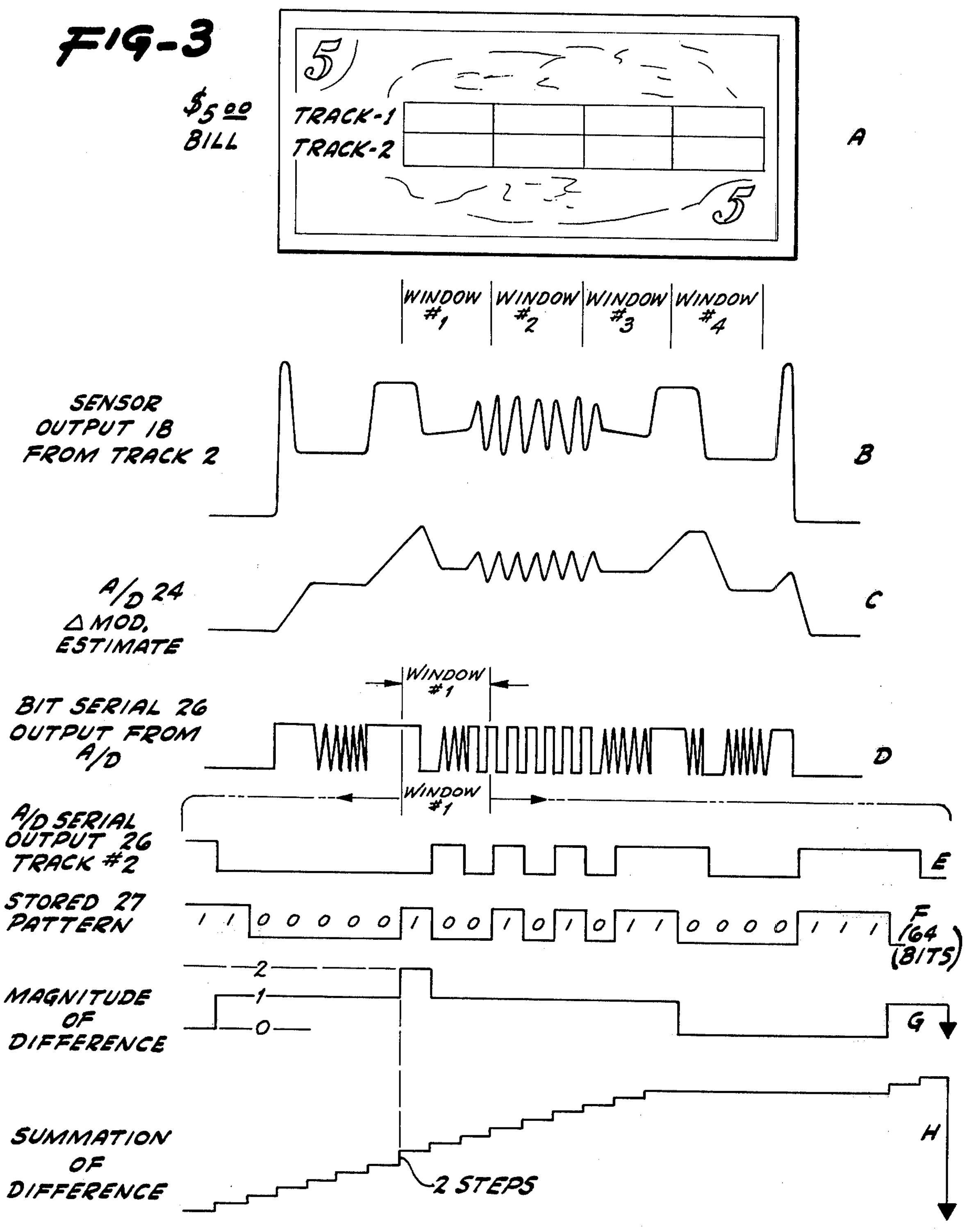
FIGS. 3A through 3H are analog and digital waveforms representative of a specific currency denomination.

Before describing the processing of microcomputer 32 the generation of the quantitative functions indicative of the amount of comparison between the patterns will be discussed in greater detail. Referring to FIGS. 3A through 3H, bill 10 is illustrated with its upper and lower tracks designated track No. 1 and track No. 2 each with its four windows. A typical lower analog sensor output 18 is shown in FIG. 3B for each of the windows with its delta modulation conversion in FIGS. 3C and 3D. FIG. 3D is the serial output on line 26; FIG. 3C shows an intermediate step where the delta modulation technique approximates the analog waveform of FIG. 3B. The bit serial output on line 26 for window 1 is shown in enlarged format in FIG. 3E; FIG. 3F indicates the stored pattern in ROM unit 27 and FIG. 3G indicates how the patterns of FIGS. 3E and 3F are compared and the absolute magnitude of the difference computed. Such difference is initially set to zero but may become any integral value between +127 and <127 during a window scan. The corresponding absolute magnitude of the difference will therefore become an integral value between zero and +127. FIG. 3H illustrates a summation of the difference by, for example, the summers 29*a* and 31*a,* after each sample interval. For example, as illustrated where the difference in a sample interval is equal to 2 there is a two step increase in the summation for this sample interval. From an actual operating standpoint, each window would have 64 sample intervals. The final magnitude of the FIG. 3H is therefore a quantitative function (0 to 127) indicative of the amount of comparison between the actual sampled pattern and the stored pattern which is representative of a corresponding segment of the denomination being verified.

Figure 4:
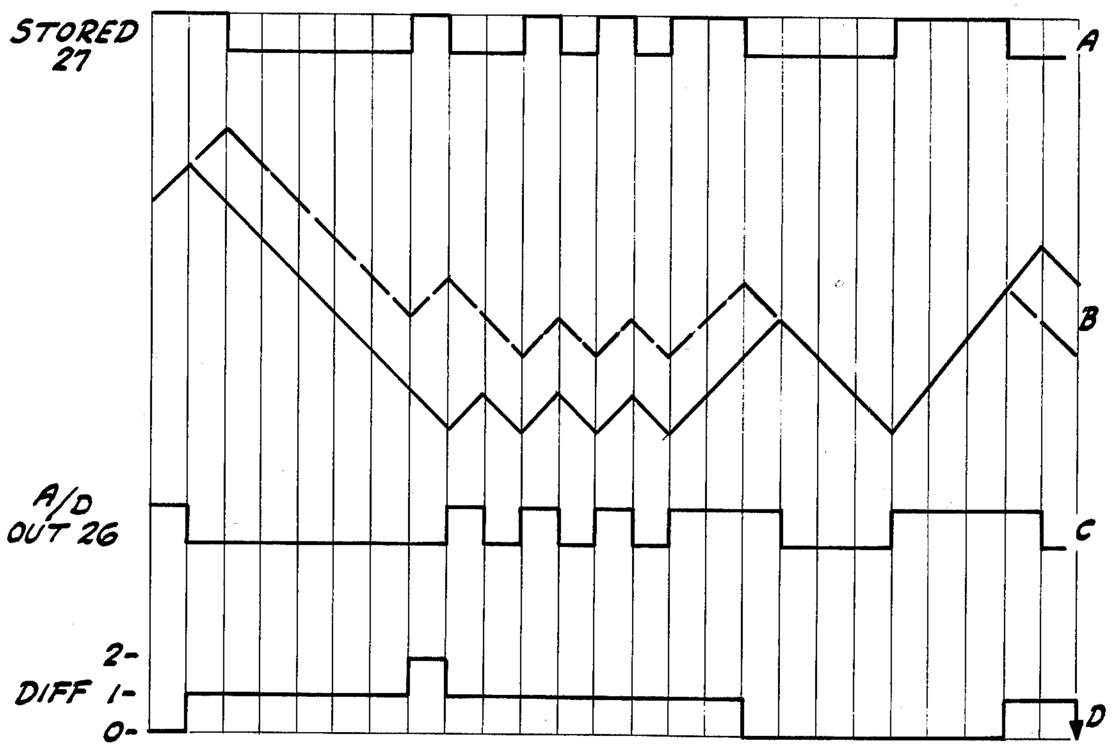
FIGS. 4A and 4B are additional waveforms useful for understanding FIG. 3.

FIGS. 4A through 4D are helpful in understanding the operation of the difference counter and show in FIG. 4B how the binary coded delta pulse code modulation patterns of FIGS. 4A and 4C respectively represent the analog waveforms of FIG. 4B with the dashed waveforms being equivalent to FIG. 4A and the solid lined waveform FIG. 4C. From inspection of the analog waveforms of FIG. 4B it is seen how the actual analog differences between the two waveforms are accurately represented by the delta modulation technique. Very simply, in the delta modulation technique a binary zero indicates a decreasing analog value and a binary one an increasing analog value; for a constant analog value there is a series of binary ones and zeros which approximates a constant analog waveform by frequently varying triangular waveforms.

FIG. 5 illustrates the delta modulation and analog to digital converter unit 24 (FIG. 2) where the output from sensor 17 is compared with a delta modulation estimate on line 33 which is an analog waveform similar to that shown in FIG. 4B. In the decision unit 34 if the input to the comparison unit is greater than the approximation an eight bit register is incremented, if less, it is decremented. This register drives the digital to analog converter 36 which provides the delta modulation analog estimate. The "YES" output of logic unit 34 is the actual bit serial output on line 26.

The foregoing delta pulse code modulation technique has, of course, been used previously in the communications field. Again, the main reason for using delta modulation is that only one bit is generated per sample resulting in low storage requirements in the bill pattern storage unit 27. However, another advantage of delta modulation is that it is a nonlinear process with "slew rate" limiting which results in good amplitude insensitivity. This is illustrated in FIGS. 6A and 6B where a dirty currency bill is illustrated in FIG. 6A necessarily having a reduced amplitude because it has lower reflectivity and a clean bill is illustrated in FIG. 6B. The slew rate is, of course, constant having the same effective slope and thus the patterns for a dirty and clean bill are more nearly identical than the original analog signal from which they were derived. Of course, the sample rate and step size of the delta modulator must be optimized in accordance with the analog magnitudes of the optical scanning system.

Figure 7:
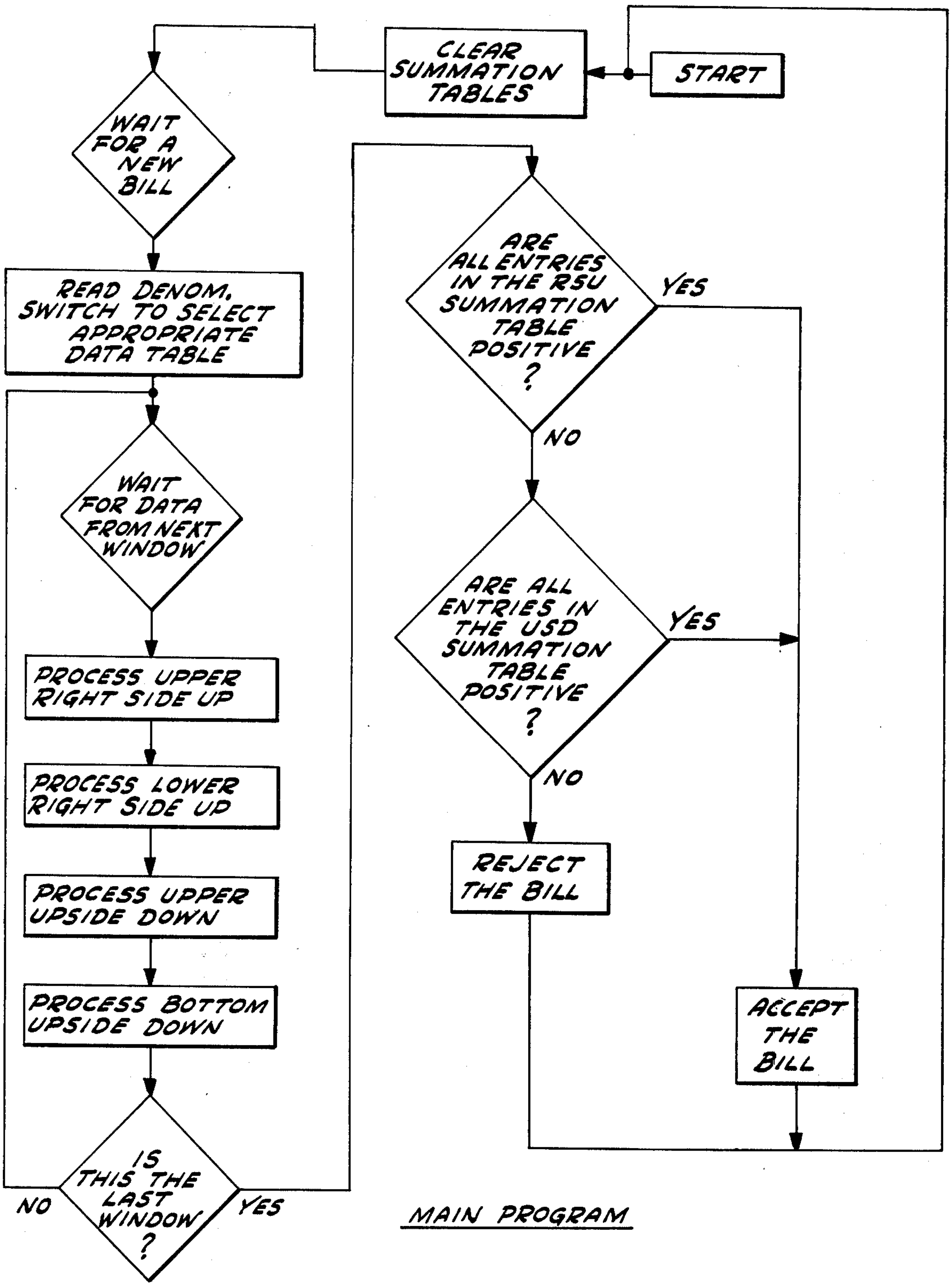
FIG. 7 is a flow chart of the program utilized in the microcomputer of FIG. 2.
Figure 8:
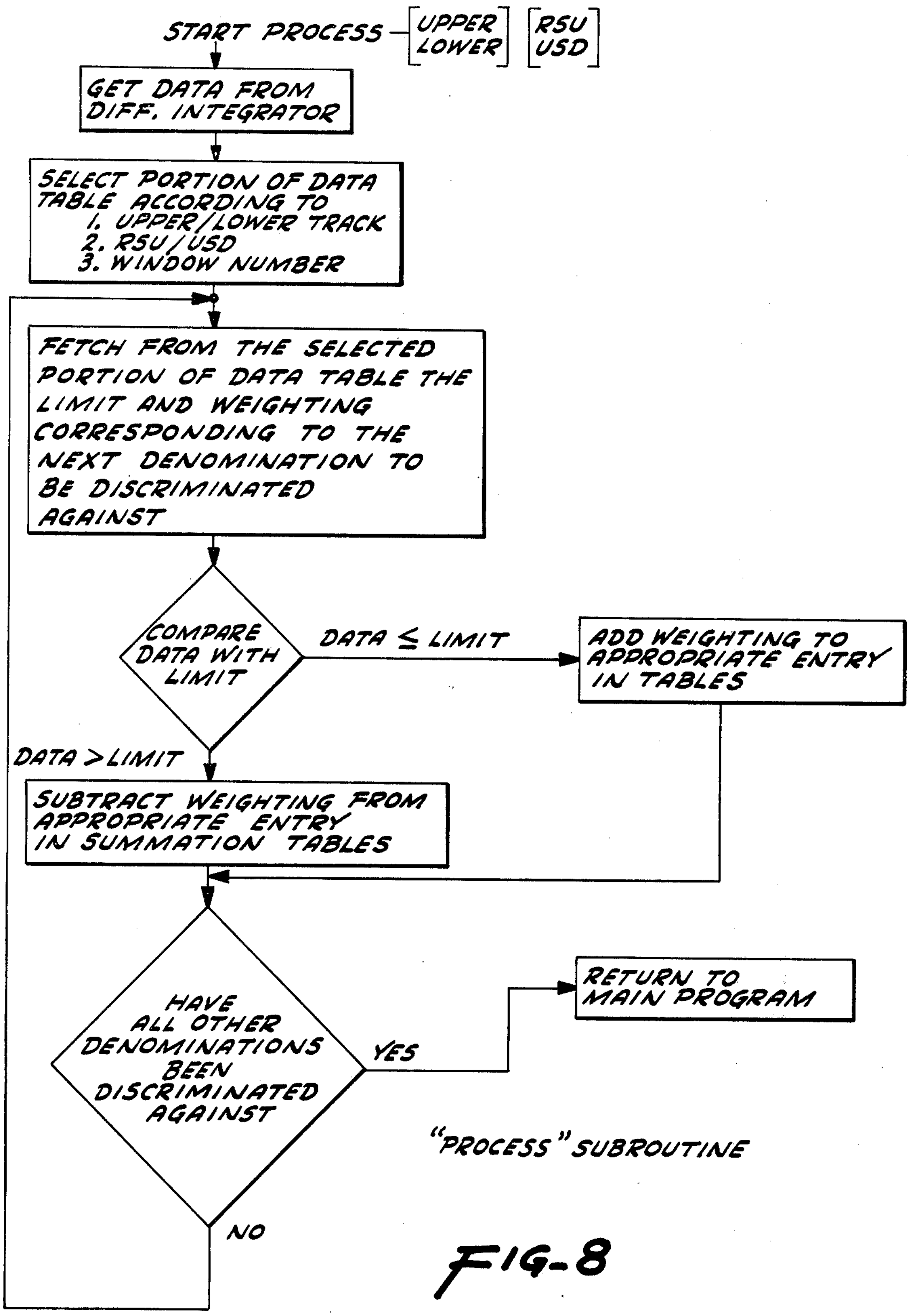
FIG. 8 is a flow chart of a subroutine for the main program of FIG. 7.

Referring now to FIGS. 7 and 8, the processing routine of microcomputer 32 will be described. In general, every time a bill is scanned by the optical processor the microcomputer 32 reads in two sets of eight numbers. There are eight effective windows or bill segments. One set of eight numbers assumes that the bill is right side up and the other set assumes that the bill is upside down. In general the microcomputer compares each of these quantitative functions (in practice an absolute octal number) with corresponding quantitative functions related to other denominations of the currency and with the use of limits and weighting functions determines whether or not to accept the bill.

In the main program of FIG. 7 when a new bill is sensed, the denomination switch 28 of FIG. 2 is read to determine which denomination is to be verified. When data from one of the eight windows is received, the outputs of the four summing units (29*a*, 31*a*, 29'*a*, 31'*a*) are individually processed by a subroutine shown in FIG. 8 and more clearly in the table of FIGS. 9 and 10A, B.

Figure 9:
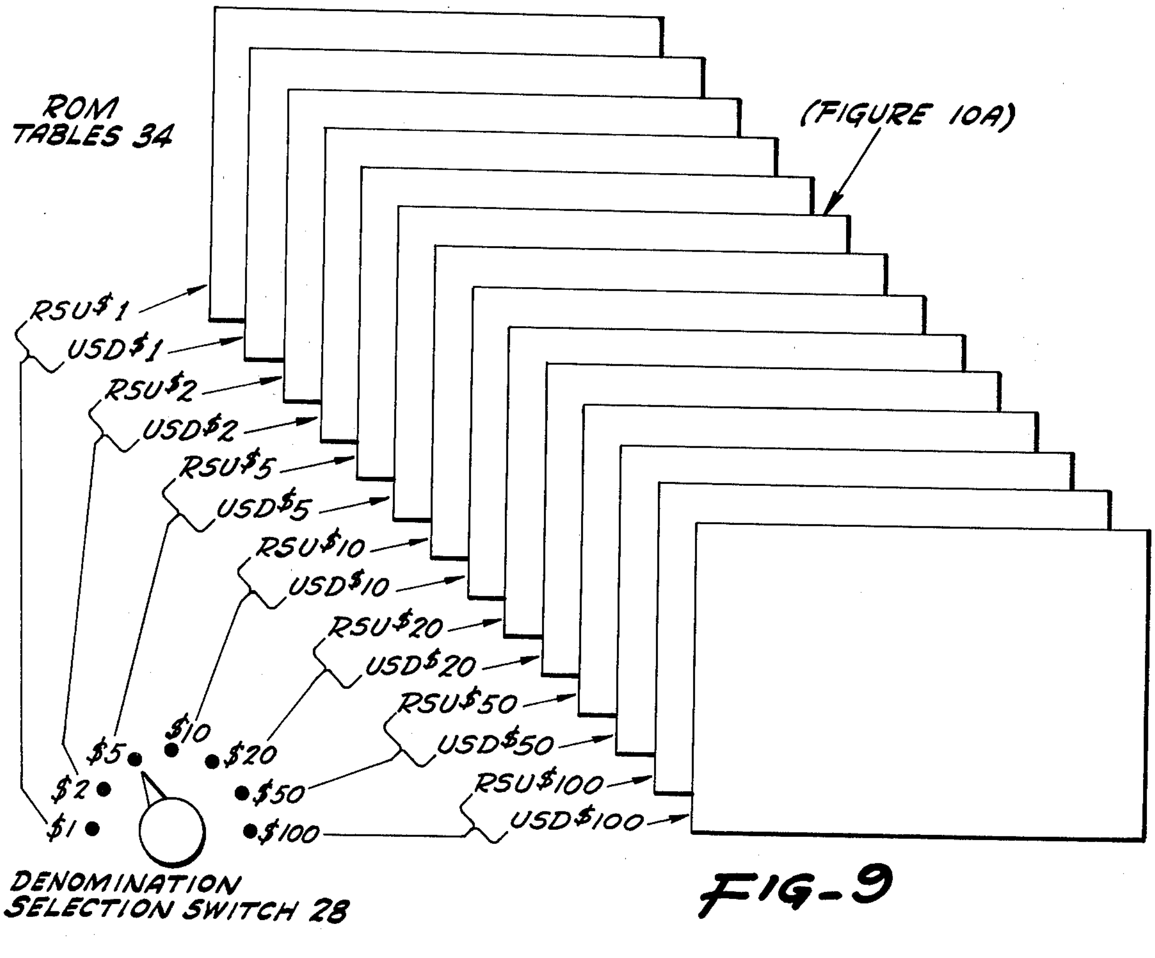
FIG. 9 shows read only memory data tables utilized in FIG. 2 useful in understanding the operation of FIG. 2.

FIG. 9 is actually ROM memory 34 and consists of 14 different tables (or seven pairs). Each table pair is associated with a particular denomination in both right side up (RSU) or upside down (USD) orientations and is used for discrimination against other denomination pairs. In particular the RSU $5 table is used to optimize the discrimination between right side up $5 bills and all other denominations and is shown in detail in FIG. 10A.

The table of FIG. 10A shows the eight effective windows upper W1 through lower W4. It lists quantitative functions or limits in octal notation and a corresponding weighting for each of the other (other than $5) currency denominations 1, 2, 10, 20, 50 and 100 for both RSU and USD. In other words, whatever is to be discriminated against. These stored quantitative functions are compared to ΣURSU and ΣLRSU from summers 29'*a* and 29*a* of FIG. 2. Associated with each of the bill denomination columns are scratchpad memories or a random access memory summation table 35 with each location in the memory being the individual summation of the results of the comparisons in the associated column.

Figure 11C:
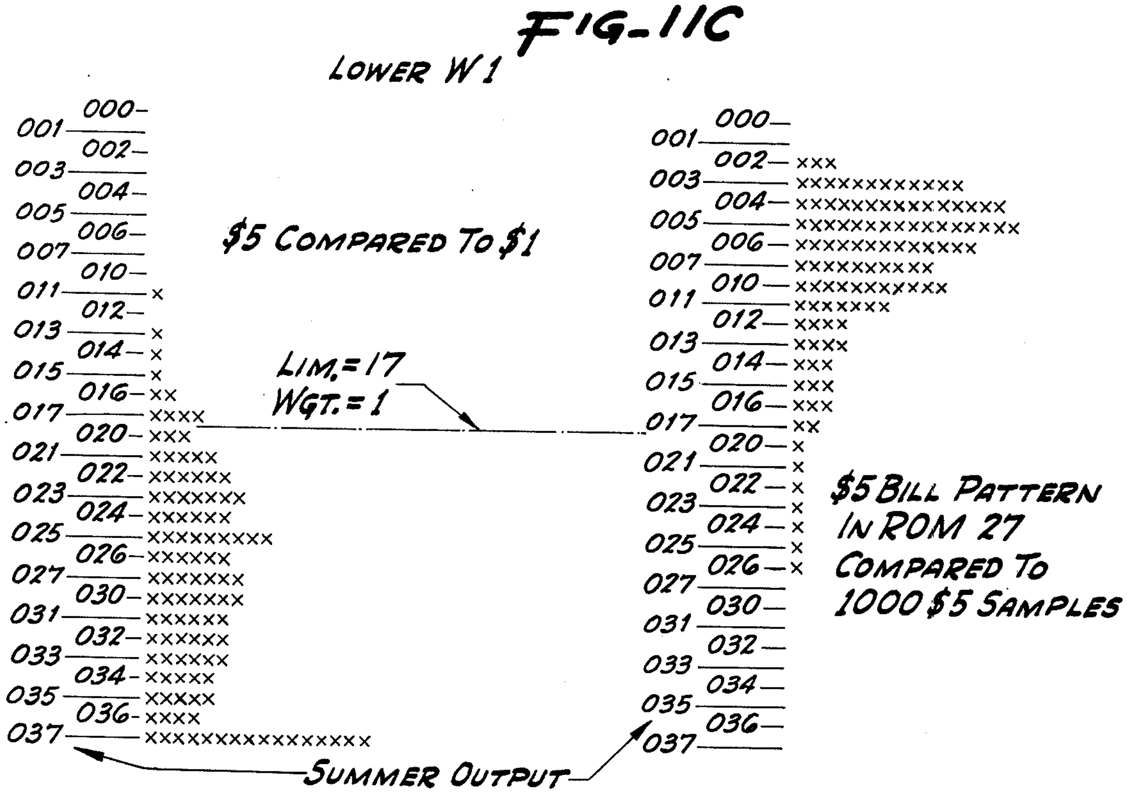
FIGS. 11A, B and C are probability distributions.
Figure 11A:
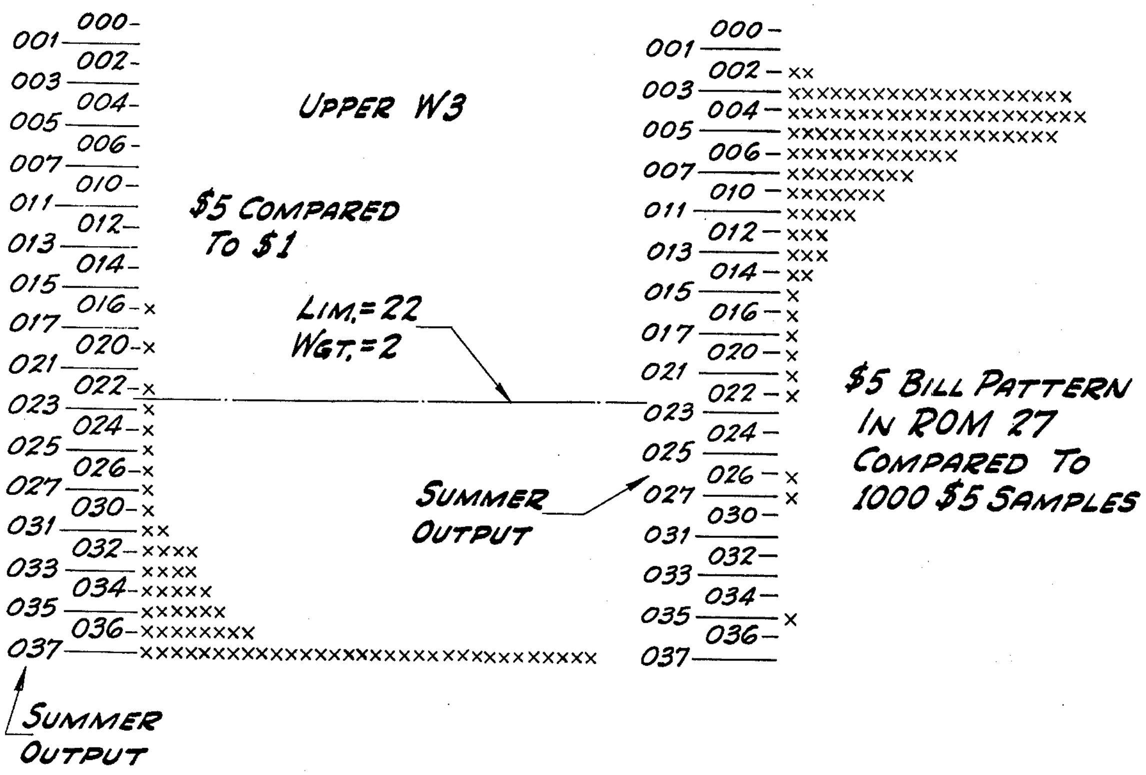

The table of FIG. 10A is generated by setting, for example, the denomination switch to five dollars, running through a batch of one dollar bills and obtaining a group of quantitative values from the summers. These are plotted in the form shown in the lower half of FIGS. 11A, B and C which are probability distributions for the lack of comparison between the RSU $5 bill pattern stored in ROM 27 (FIG. 2) and $1 bills. FIGS. 11A, B and C correspond to windows upper W3, upper W1 and lower W1, respectively. The Xs indicate the relative number of $1 bills having the indicated summer output (from 000 to 037 octal). The higher the number the greater the lack of comparison.

Another set of probability distribution is obtained by again comparing the $5 bill pattern in ROM 27 with 1,000 $5 samples. The results are plotted in the upper half of FIGS. 11A, B and C and naturally show a mean value much closer to 000. The sigma or standard deviation varies due to dirt, mechanical tolerance problems and other factors.

Figure 11B:
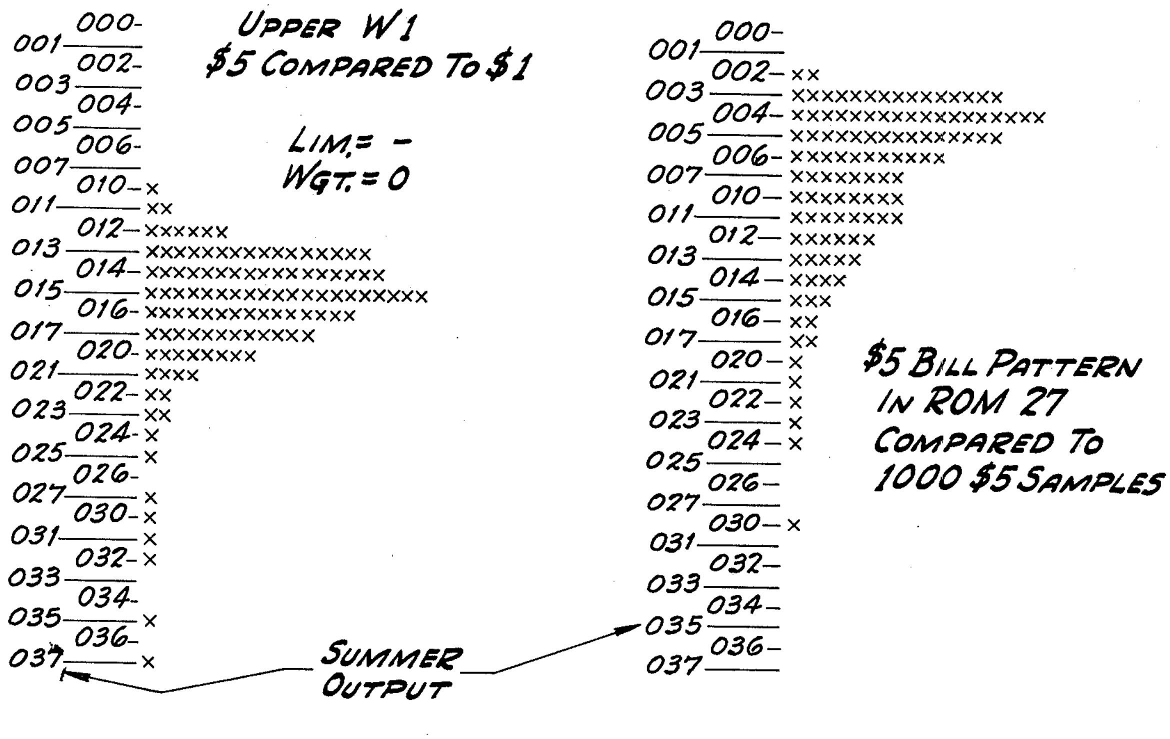

A limit quantity for each window is established by drawing a line between the two probability distributions which hopefully will exclude their high and low ends. See FIG. 11A where the limit of 22 still allows a few possible errors. However, the mean values of FIG. 11B have so little offset that no limit is established and a weighting of zero given. FIG. 11C is better than FIG. 11B but worse than FIG. B because of its higher standard deviation and thus receives a weighting of one as compared to the FIG. 11A weighting of two.

All of the foregoing limits and weights are stored in the RSU $1 column of FIG. 10A. The foregoing is done for all of the other denominations desired to be discriminated against. Thus by providing for discrimination against other denominations the accuracy of the present invention is enhanced resulting in a low error rate. Along with each limit quantitative function there is the weight function which may be zero, one, two or three indicating the relative importance to be attached to this particular limit.

Referring to FIGS. 10A, B, if the ΣLRSU function from summer 29*a* for window W1 is equal or less than 17, then a one is added in the scratchpad memory 35 in the column designated RSU $1. If a quantitative function value greater than 17 limit is indicated, then this means there is a substantial lack of comparison and a one valve is subtracted. This same procedure is also followed with all the other columns representing all the other denominations. When the upper window, W3, is scanned, the process is repeated and as shown, for example, with a limit of 22 and a weighting of two, a two value is added or subtracted from the same location in the scratchpad memory 35 depending upon whether the limit is less than or equal to 22 or greater than 22. In the case of upper W1 with a weighting of zero no action is taken. In this manner, all the windows are scanned and compared with all the different denominations. If all values are positive in the memory, then the bill is accepted as being a true bill of that denomination. If any are negative, it is rejected. Values of zero are considered to be positive. A similar process is simultaneously followed, including the use of another scratchpad memory, in order to determine whether the bill was an upside down $5 bill.

The foregoing functioning is set out by the flow chart of FIG. 8 where when, for example, a lower RSU value is to be processed this data is obtained from the difference integrator or summer and a limit function from ROM data table 34 is read out and compared. As described above depending whether the actual data is above or below the limit, the appropriate value, i.e., the weighting function with a plus or minus sign, is inserted in the RAM summation tables 35 shown both in FIG. 2 and FIG. 10B. This is done for the particular window until all locations in the RAM summation tables 35 have been updated. The program of FIG. 8 is returned to and when the last window as illustrated in FIG. 7 has been scanned the question is asked are all of the entries in the right side up table positive. If yes, the bill is accepted. If the previous answer was no, then the upside down table is consulted. If a yes occurs, the bill is accepted; if no it is rejected.

The following two examples better illustrate the invention. In the first assume the denomination switch is set to $5 but a $1 bill (which should be rejected) is being scanned. The results from comparing the stored pattern in ROM 27 of the $5 bill with the scanned one are

| | | |
|---|---|---|
| Upper | W1 | 20 |
| Lower | W1 | 16 |
| . | . | 16 |
| . | . | 21 |
| . | . | 37 |
| . | . | 37 |
| Upper | W4 | 23 |
| Lower | W4 | 17 |

The foregoing are compared with the entries in FIG. 10A in the RSU $1 column which, of course, is optimized for rejecting RSU $1 bills when verifying RSU $5 bills. The detailed calculation is as follows:

| | A | B | C | D | E | F |
|---|---|---|---|---|---|---|
| Upper W1 | 20 | 0 | 0 | – | 0 | 0 |
| Lower W1 | 16 | 17 | 1 | + | +1 | 1 |
| . W2 | 16 | 0 | 0 | – | 0 | 1 |

-continued

| | A | B | C | D | E | F |
|---|---|---|---|---|---|---|
| . W2 | 21 | 22 | 1 | + | +1 | 2 |
| . W3 | 37 | 22 | 2 | − | 2 | 0 |
| . W3 | 37 | 26 | 3 | − | 3 | 3 |
| . W4 | 23 | 17 | 1 | − | 1 | 4 |
| Lower W4 | 17 | 13 | 1 | − | 1 | −5 |

where

A — The output from summers 29*a* and 29'*a*

B — Limits from RSU $1 column

C — Weighting

D — Result of comparison; + if data is equal or less than limit, otherwise negative E — Weighting modified by results of comparison F — Running summation of modified weighting The final result of the summation is "−5" which is stored in the first column of the RAM table 35 of FIG. 10B. The remaining entries are −6 (RSU $2), −7 (RSU $10), +2 (RSU $20), and −2, −1, −4, +7, +3, 0, −6, −3, respectively. Because of the several negative numbers the $1 bill will not be accepted as a RSU $5 bill. However, it will still be compared to an USD $5 bill, the table for which has not been illustrated but is generally shown in FIG. 9.

In the second example it will be assumed a $5 bill was scanned resulting in the following summed differences:

| | | |
|---|---|---|
| Upper | W1 | 04 |
| . | W1 | 03 |
| . | W2 | 03 |
| . | W2 | 24 |
| . | W3 | 07 |
| . | W3 | 06 |
| . | W4 | 03 |
| Lower | W4 | 15 |

The foregoing numbers are, of course, expected to be small with the 24 and 15 possibly resulting from localized defects on the bill. The results of the comparison with FIG. 10A in FIG. 10B is +5, +10, +3, +14, +2, +7, +6, +13, +7, +14, +4 and +7, respectively. Since all numbers are positive the bill is verified as a RSU $5.

Figure 12:
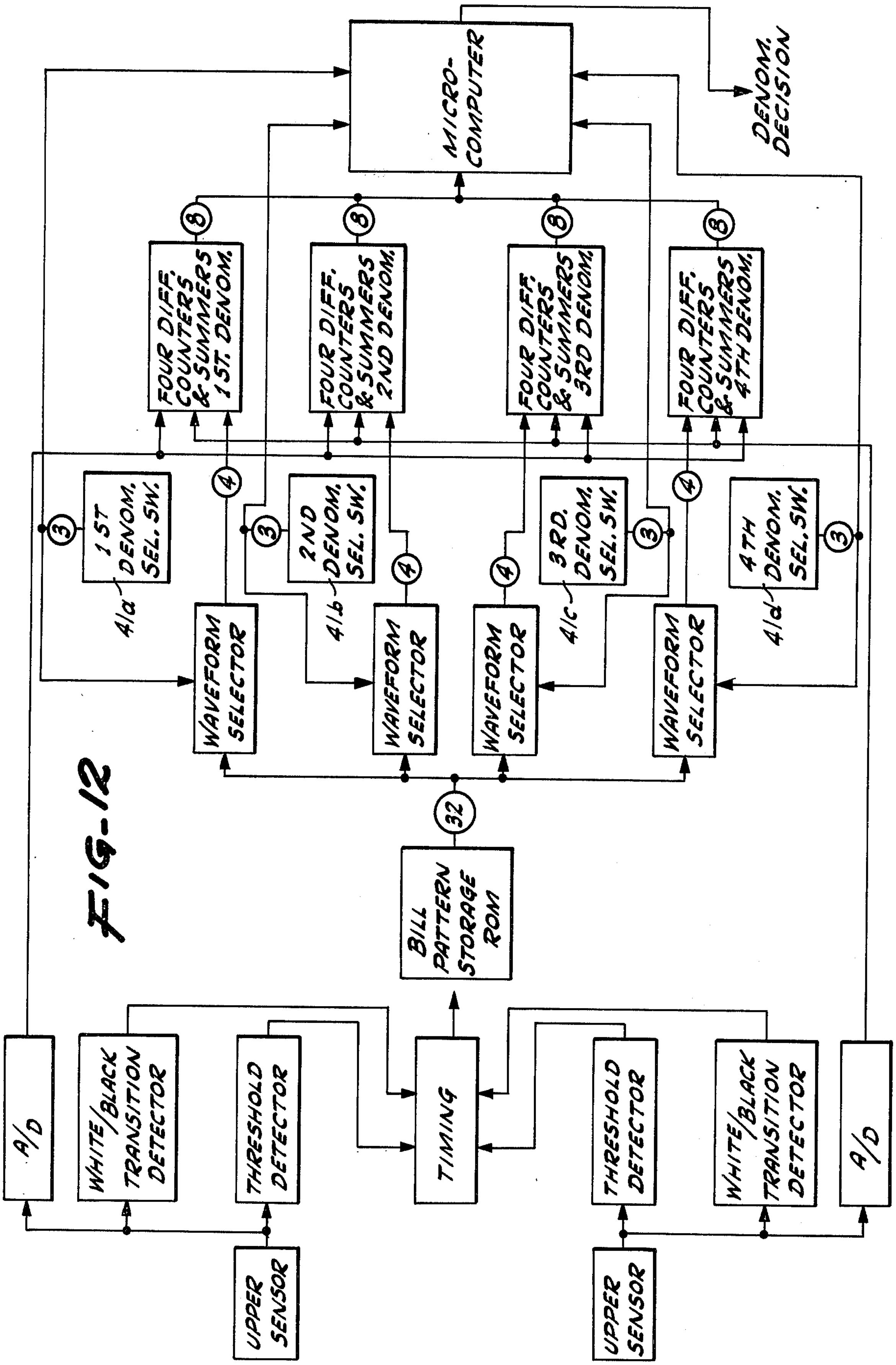
FIG. 12 is a block diagram similar to FIG. 2 of another embodiment of the invention.
Figure 13:
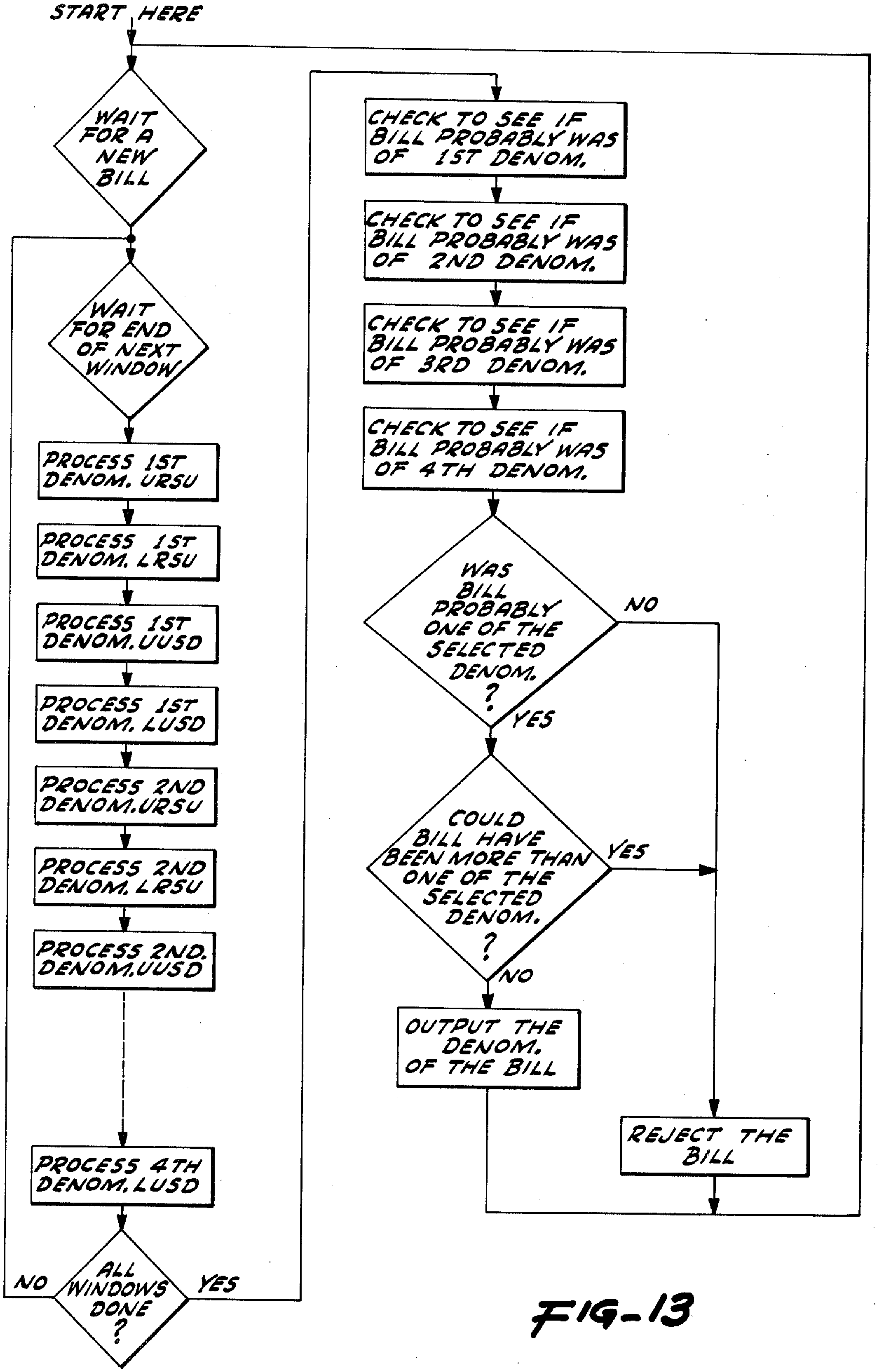
FIG. 13 is a flow chart for FIG. 12.

From the foregoing, it is apparent that in addition to merely verifying a particular denomination and discriminating against other denominations of particular currency, the present invention may select by the same techniques a group of several denominations. FIG. 12 illustrates a method of selecting four different denominations where the selector switches 41*a* through *d* provide for selection. Thus, the number of difference counters and summers must be multiplied by four to achieve this result. The flow chart of FIG. 13 is the main program and is similar to FIG. 7 except that four times as much processing is required. However, as indicated by the final step of the process rather than discriminating against all of the other denominations, all denominations are checked and the question is asked was the bill probably one of a selected denomination. Then the efficiency of the process is improved by asking could it have been more than one. If this is untrue, then a single denomination has been found.

Thus, the present invention has provided an improved method of verifying a currency denomination and in addition for selecting several denominations out of a larger group. In other words, the invention when it speaks of verifying a denomination also encompasses the actual selection of a single denomination from a group of denominations. With the use of two tracks and the right side up and the upside down technique of the present invention and in addition the delta modulation technique, the correct decision is arrived at independent of the physical condition of the bill including dirt, folds, age and positional variations of printing.

What is claimed is:

1. A method for verifying the denomination of currency relative to other denominations of such currency using digital logic with a memory comprising the following steps: storing in said memory a pattern representative of the reflectivity of at least one predetermined segment of at least one currency denomination; scanning a currency to be verified as having said one denomination over said one predetermined segment and generating a pattern representative of such semgent; comparing said pattern of said scanned currency with said stored pattern of said one denomination and generating a quantitative function indicative of the amount of comparison between said patterns; storing quantitative functions indicative of the amount of comparison between said stored pattern of said one denomination and corresponding segments of said other denominations; comparing each of said quantitative functions of said other denominations with said generated quantitative function.

2. A method as in claim 1 where said patterns are binary codes each bit of such codes representing one analog sample obtained from scanning a currency denomination.

3. A method as in claim 2 where said patterns are of the delta pulse code modulation type.

4. A method as in claim 3 including the step of fixing the slew rate of said delta modulation thereby compensating for variations in the magnitude of said analog samples.

5. A method as in claim 2 where said step of comparing said patterns includes a bit by bit comparison with the resulting difference over the entire segment being summed to generate said quantitative function.

6. A method as in claim 1 where a plurality of patterns representing a plurality of segments of a currency denomination are stored in said memory, and a plurality of segments are scanned, and a plurality of quantitative functions are generated, and a plurality of quantitative functions are stored relative to said other denominations, and including the steps of assigning relative weights to each comparison of each of said plurality of segments with one other denomination and summing all of said weighted comparisons for all of said segments with the individual sums of all of the segments associated with a particular other denomination producing a decision as to the verity of said scanned denomination.

7. A method as in claim 1 where said stored pattern is an average of several samples of said one currency denomination.

8. A method as in claim 1 where said stored quantitative functions includes both limit and weighting quantities which are obtained by the following steps; determining a first probability distribution of a stored pattern compared to a plurality of currency of said one denomination, determining a second probability distribution of said stored pattern compared to a plurality of currency of a selected another denomination, establishing said limit quantity between said probability distributions, and weighting said limit in accordance with the standard deviations diviations of said probability distributions and the offset between their mean values.

9. A method as in claim 1 where said currency has a front side and a back side which is relatively unique compared to said front side in accordance with its denomination said scanning being done near the center of said back side.

10. A method as in claim 1 including the step of sensing the edge of printing on said currency to establish timing.

11. A method for verifying the denomination of currency relative to other denominations of such currency using digital logic with a memory comprising the following steps: storing in said memory a binary coded pattern representative of the multi-level analog reflectivity of at least one predetermined segment of at least one currency denomination each bit of such coded pattern in conjunction with all preceding bits of such pattern representing one analog sample obtained from scanning a currency denomination; scanning a currency to be verified as having said one denomination over said predetermined segment corresponding to said one predetermined segment and generating a binary coded pattern representative of such segments; and comparing on a bit by bit basis said pattern of said scanned currency denomination with said stored pattern of said one denomination and generating a quantitative function indicative of the amount of comparison between said patterns.

* * * * *